United States Patent [19]

Blocker et al.

[11] Patent Number: 4,927,896

[45] Date of Patent: May 22, 1990

[54] PROCESS FOR POLYMERIZING MONOALLYLAMINE

[75] Inventors: Wesley C. Blocker; David N. Roark; Edwin D. Hornbaker, all of Baton Rouge, La.

[73] Assignee: Ethyl Corporation, Richmond, Va.

[21] Appl. No.: 375,034

[22] Filed: Jul. 3, 1989

Related U.S. Application Data

[63] Continuation of Ser. No. 148,907, Jan. 27, 1988, abandoned, which is a continuation-in-part of Ser. No. 855,940, Apr. 25, 1986, abandoned.

[51] Int. Cl.$^5$ .......................... C08F 2/16; C08F 26/02
[52] U.S. Cl. ...................................... 526/93; 526/310
[58] Field of Search ........................................... 526/93

[56] References Cited

U.S. PATENT DOCUMENTS

| | | |
|---|---|---|
| 2,456,428 | 12/1948 | Parker . |
| 2,662,875 | 12/1953 | Chaney . |
| 2,700,027 | 1/1955 | Bruson . |
| 2,926,161 | 2/1960 | Butler et al. . |
| 3,057,833 | 10/1962 | Devlin . |
| 3,062,798 | 11/1962 | Lovett . |
| 3,288,770 | 11/1966 | Butler . |
| 3,412,019 | 11/1968 | Hoover et al. . |
| 3,544,318 | 12/1970 | Boothe et al. . |
| 3,619,394 | 11/1971 | Battaerd et al. . |
| 3,743,715 | 7/1973 | Viout et al. . |
| 3,790,537 | 2/1974 | Panzer et al. . |
| 3,833,531 | 9/1974 | Keim . |
| 3,839,237 | 10/1974 | Battaerd et al. . |
| 3,910,862 | 10/1975 | Barabas . |
| 3,912,808 | 10/1975 | Sokol . |
| 3,941,724 | 3/1976 | Bolto .................................. 526/310 |
| 3,957,699 | 5/1976 | Solomon et al. . |
| 3,986,825 | 10/1976 | Sokol . |
| 3,990,958 | 11/1976 | Sasse . |
| 3,996,146 | 12/1976 | Tarasov . |
| 4,053,512 | 10/1977 | Panzer et al. . |
| 4,121,986 | 10/1978 | Battaerd .............................. 526/310 |
| 4,287,172 | 9/1981 | Jaequet .............................. 526/310 |
| 4,329,441 | 5/1982 | Bergthaller . |
| 4,504,640 | 3/1985 | Harada et al. . |
| 4,528,347 | 7/1985 | Harada et al. . |
| 4,540,760 | 9/1985 | Harada et al. . |
| 4,583,989 | 4/1986 | Ueda . |
| 4,604,451 | 8/1986 | Harada et al. . |
| 4,605,701 | 8/1986 | Harada et al. . |

FOREIGN PATENT DOCUMENTS

| | | |
|---|---|---|
| 274029 | 7/1965 | Australia . |
| 361273 | 2/1977 | Australia . |
| 0095233 | 11/1983 | European Pat. Off. . |
| 0131306 | 1/1985 | European Pat. Off. . |
| 0140309 | 5/1985 | European Pat. Off. . |
| 49-69789 | 7/1974 | Japan . |
| 51-57793 | 5/1976 | Japan . |
| 905831 | 9/1962 | United Kingdom . |
| 907079 | 10/1962 | United Kingdom . |
| 939518 | 10/1963 | United Kingdom . |

OTHER PUBLICATIONS

Encyclopedia of Polymer Science and Technology, Wiley & Sons, 1964, vol. 1, pp. 750-759.
J. Macromol. Sci.-Chem., 1976, vol. A(10) pp. 857-873.
Makromol Chem., 1985 vol. 186, pp. 2547-2556.
Australian Journal of Chemistry, 1966, vol. 19, pp. 791-796.
Australian Journal of Chemistry, 1968, vol. 21, pp. 2703-2710.
J. Water Poll. Control Fed., 1966, vol. 38, pp. 1782-1804.
C. E. Schildknecht, Allyl Compounds and Their Polymers, Wiley-Inter-Science Pub., Copyright 1973, pp. 29-30 and 523-524.
Harada et al. Macromolecular Chem. Rapid Communications, 5, 27-31 (1984).
Polyallylamine Hydrochloride (Nitto Boseki, Ltd. Brochure).
R. C. Laible, Allyl Polymerizations, Chem. Rev., 58 (5) 807-843 (1958).
J. Inst. Eng. 1965, vol. 37, pp. 193-199.
J. Am. Chem. Soc. 1955, vol. 77, pp. 1767-1769.
Australian Journal of Chemistry, 1966-vol. 19 pp. 561-587.
Australian Journal of Chemistry, 1966, vol. 19, pp. 589-608.
Australian Journal of Chemistry, 1966, vol. 19, pp. 765-789.

*Primary Examiner*—Christopher Henderson
*Attorney, Agent, or Firm*—Patricia J. Hogan

[57] ABSTRACT

A water-soluble salt of monoallylamine is polymerized in an aqueous reaction medium at a temperature of about 30°–80° C. in the presence of a polymerization initiator comprising about 3–15% by weight of hydrogen peroxide and about 1–700 ppm of a multi-valent metal ion, based on the weight of the monomer charge. The hydrogen peroxide is preferably introduced continuously or periodically during a substantial portion of the polymerization reaction. Preferred sources of the metal ion are water-soluble iron salts, such as ferric or ferrous chloride.

18 Claims, No Drawings

PROCESS FOR POLYMERIZING MONOALLYLAMINE

CROSS-REFERENCE TO RELATED APPLICATION

This application is a continuation of application Ser. No. 148,907 filed Jan. 27, 1988 now abandoned, which in turn is a continuation-in-part of application Ser. No. 855,940, filed Apr. 25, 1986 now abandoned.

FIELD OF THE INVENTION

This invention relates to a process for polymerizing monoallylamine.

BACKGROUND

As disclosed by Harada et al. in, e.g., U.S. Pat. Nos. 4,504,640, 4,528,347, and 4,540,760, certain types of azo polymerization initiators are useful in producing monoallylamine polymers having a high degree of polymerization in high yield — a remarkable discovery when it was made, since previous attempts to polymerize monoallylamine with radical or ionic initiators had resulted at best in the formation in low yield of polymers having a low degree of polymerization. This discovery has made it now commercially feasible to prepare poly(monoallylamine) and its salts. However, there is a need for a less expensive process, such as a process using a less expensive initiator.

SUMMARY OF INVENTION

An object of this invention is to provide a novel process for polymerizing monoallylamine.

Another object is to provide such a process which results in the formation of polymers having a suitably high molecular weight in good yields.

A further object is to provide such a process which is economical.

These and other objects are attained by polymerizing a monomer charge comprising a water-soluble salt of monoallylamine in an aqueous reaction medium at a temperature of about 30–80° C. in the presence of a polymerization initiator comprising about 3–5% by weight of hydrogen peroxide and about 1–700 ppm of a multivalent metal ion, based on the weight of the monomer charge.

DETAILED DESCRIPTION

The monomer charge which is polymerized in the practice of the invention comprises a water-soluble salt of monoallylamine as an essential component and may also contain a minor proportion of one or more copolymerizable monomers. Monoallylamine itself may be introduced into the reaction medium when the medium contains enough of a strong inorganic acid to convert it to the salt. However, it is more commonly introduced in the form of one of its water-soluble salts, such as the hydrochloride, hydrobromide, hydrofluoride, hydrogen phosphate, dihydrogen phosphate, nitrate, bisulfate, etc., preferably as an aqueous solution. When a copolymerizable monomer such as a water-soluble salt of diallylamine is employed, it generally constitutes not more than about 20%, preferably not more than about 10% of the weight of the monomer charge. When a multifunctional monomer, such as N,N,N',N'-tetraallyl-1,6-hexanediamine, N,N,N',N'-tetraallyl-1,4butanediamine, N,N,N',N',N'',N''-hexaallylmelamine, N,N,N'-triallyl-1,6-hexanediamine, or the like, is used — at least when water-dispersible polymers are desired — the amount of multi-functional monomer should be kept below about 5 mol %, frequently below about 2 mol %, because of the tendency for the polymer products to have reduced water dispersibility when larger amounts are utilized.

The hydrogen peroxide employed as a component of the initiator may be any available aqueous hydrogen peroxide solution, since its concentration in the solution is not critical, although the more highly concentrated solutions are preferred to reduce the dilution of monomer. However, as indicated above, the solution should be used in an amount such as to provide about 3–15%, preferably about 5–10% by weight of hydrogen peroxide, based on the weight of the monomer charge. It is preferred to introduce the hydrogen peroxide continuously or periodically during a substantial portion of the polymerization reaction.

The multivalent metal ion can potentially be provided by any water-soluble salt of a metal which is capable of existing in different valence states, such as iron, titanium, vanadium, chromium, manganese, cobalt, copper, germanium, niobium, molybdenum, ruthenium, tin, antimony, tellurium, cerium, neodymium, osmium, iridium, platinum, gold, mercury, thallium, lead, and uranium — such salts including, e.g., the halides, nitrates, phosphates, sulfates, hydroxides, chlorates, perchlorates, formates, acetates, bromates, iodates, and the like. However, the metal source is preferably a water-soluble iron salt, such as ferrous or ferric chloride. The metal source is employed in an amount such as to provide about 1–700 ppm of the multivalent metal ion, based on the weight of the monomer charge.

In a preferred embodiment of the invention, the amount of free (i.e., uncomplexed) multivalent metal ion in the system is not more than about 250 ppm, most preferably about 3–200 ppm, based on the weight of the monomer charge. This concentration of the ion can be provided by using the amount of metal source which normally provides that concentration or by using an excess of the metal source in combination with a suitable water-soluble complexing agent, such as a water-soluble pyrophosphate salt (e.g., sodium or potassium pyrophosphate), sodium ethylenediamine tetraacetate, sodium citrate, or the like, usually in an amount of about 0.1–0.5 mol per gram atom of multivalent metal ion. The avoidance of too much free multivalent metal ion in the system appears to enhance the polymerization rate and polymer yield.

The reaction medium is preferably composed predominantly or exclusively of water, but other aqueous media may be used, such as mixtures of water and water-miscible alcohols or glycols, inorganic acids (e.g., hydrochloric, nitric, or sulfuric acid), acetic acid, or other water-miscible organic compounds which do not have a particularly adverse effect on free radical polymerization.

The invention is advantageous as an economical means of preparing linear or branched homopolymers or copolymers or lightly crosslinked copolymers of monoallylamine having a suitably high molecular weight.

The following examples are given to illustrate the invention and are not intended as a limitation thereof.

EXAMPLE I

Eight polymerizations were conducted by (1) adding an aqueous monoallylamine hydrochloride solution and the appropriate amount of ferric chloride (either as a solid or as an aqueous solution) to a suitable reaction vessel, (2) removing oxygen by evacuating the vessel three times to a pressure equal to the vapor pressure of the reaction mixture, holding at that pressure for five minutes while allowing the solution to boil, and then breaking the vacuum each time by the addition of nitrogen, (3) heating the reaction mixture to the desired temperature, (4) injecting a 30% aqueous solution of hydrogen peroxide at a constant pump rate such as to provide the appropriate amount of hydrogen peroxide at the end of the injection time, and (5) when appropriate, continuing the polymerization. The details and results of the polymerizations are shown in Table I.

TABLE I

| Run No. | Metal Ion Conc. (ppm) | $H_2O_2$ (wt. %) | Injection Time (hrs.) | Run Time (hrs.) | Run Temp. (°C.) | Conversion (%) | Polymer Viscosity (cps.) |
|---|---|---|---|---|---|---|---|
| 1 | 1.7 | 5.0 | 70 | 70 | 50 | 71 | 90 |
| 2 | 3.5 | 5.0 | 70 | 70 | 50 | 92 | 540 |
| 3 | 170 | 5.0 | 70 | 70 | 50 | 92 | 600 |
| 4 | 350 | 5.0 | 70 | 70 | 40 | 68 | 100 |
| 5 | 350 | 5.0 | 70 | 70 | 50 | 75 | 200 |
| 6 | 500 | 5.0 | 28 | 72 | 50 | 52 | — |
| 7 | 688 | 7.5 | 24 | 40 | 50 | 69 | 104 |
| 8 | 688 | 10.0 | 8 | 8 | 60 | 44 | — |

Table I shows that the conversion is adversely affected by the use of too high a concentration of metal ion. The following example demonstrates that it is possible to compensate for a high ion concentration by the use of a complexing agent.

EXAMPLE II

Seven polymerizations were conducted by the procedure described in Example I except for the use of sodium pyrophosphate decahydrate as a complexing agent. In Polymerization Runs 9–13, 0.1% by weight of the complexing agent was added to the initial reaction solution; the amounts added to the initial reaction solution in Runs 14 and 15 were 0.15% and 0.5% by weight, respectively. The run of particular interest for direct comparison with a polymerization run of Example I is Run 10, which was conducted under the same conditions as Run 5 (except for the use of the complexing agent) and provided a substantially higher conversion.

The details and results of the polymerizations are shown in Table II.

TABLE II

| Run No. | Metal Ion Conc. (ppm) | $H_2O_2$ (wt. %) | Injection Time (hrs.) | Run Time (hrs.) | Run Temp. (°C.) | Conversion (%) | Polymer Viscosity (cps.) |
|---|---|---|---|---|---|---|---|
| 9 | 350 | 5.0 | 60 | 64 | 55 | 78 | 620 |
| 10 | 350 | 5.0 | 70 | 70 | 50 | 89 | 560 |
| 11 | 370 | 5.3 | 70 | 70 | 50 | 89 | 160 |
| 12 | 344 | 7.5 | 92 | 92 | 50 | 96 | 280 |
| 13 | 344 | 10.0 | 92 | 92 | 50 | 99.5 | 304 |
| 14 | 50 | 5.3 | 70 | 70 | 47 | 87 | 70 |
| 15 | 190 | 5.3 | 70 | 70 | 48 | 90 | 110 |

EXAMPLE III

Five polymerizations were conducted by the procedure described in Example I except for the use of different metal sources and, in Run 16, the addition of 0.1% by weight of sodium pyrophosphate decahydrate to the initial reaction solution. The metal source used in Runs 16 and 17 was ferrous chloride; the metal sources used in Runs 18, 19, and 20 were cobaltous chloride, manganous chloride, and cupric chloride, respectively. The details and results of the polymerizations are shown in Table III.

TABLE III

| Run No. | Metal Ion Conc. (ppm) | $H_2O_2$ (wt. %) | Injection Time (hrs.) | Run Time (hrs.) | Run Temp. (°C.) | Conversion (%) | Polymer Viscosity (cps.) |
|---|---|---|---|---|---|---|---|
| 16 | 350 | 5.0 | 70 | 70 | 50 | 82 | 720 |
| 17 | 5 | 5.3 | 70 | 70 | 43 | 70 | 40 |
| 18 | 3.7 | 5.0 | 70 | 70 | 50 | 77 | 120 |
| 19 | 370 | 5.3 | 70 | 70 | 48 | 40 | 20 |
| 20 | 370 | 5.3 | 70 | 70 | 48 | 34 | 20 |

The preceding examples demonstrate the effectiveness of the hydrogen peroxide/multivalent metal ion system in polymerizing monoallylamine hydrochloride. This effectiveness is particularly surprising in that such systems are recognized in the art as being equivalent to t-butyl hydroperoxide/multivalent metal ion and hydroxylamine/multivalent metal ion systems in the polymerization of allylamines containing more than one allyl group, but the latter systems are, in fact, ineffective in polymerizing monoallylamine hydrochloride. This ineffectiveness is demonstrated in the following examples.

COMPARATIVE EXAMPLE A

Following the general procedure described in Example I, monoallylamine hydrochloride was heated at 50° C. in an aqueous medium containing 344 ppm of metal ion derived from ferric chloride, 0.1% by weight of sodium pyrophosphate decahydrate, and 5% by weight of t-butyl hydroperoxide which was injected over a period of 19 hours. After a run time of 23 hours there was less than 1% conversion of the monoallylamine and no formation of polymer.

COMPARATIVE EXAMPLE B

Following the general procedure described in Example I, monoallylamine hydrochloride was heated at 50° C. in an aqueous medium containing 140 ppm of metal ion derived from ferric chloride and 20% by weight of t-butyl hydroperoxide which was injected over a period of 85 hours. After a run time of 85 hours there was less than 1% conversion of the monoallylamine and no formation of polymer.

COMPARATIVE EXAMPLE C

Following the general procedure described in Example I, monoallylamine hydrochloride was heated at 56° C. in an aqueous medium containing 140 ppm of metal ion derived from ferric chloride and 15% by weight of hydroxylamine hydrochloride which was injected over a period of 85 hours. After a run time of 85 hours there was less than 1% conversion of the monoallylamine and no formation of polymer.

COMPARATIVE EXAMPLE D

Following the general procedure described in Example I, monoallylamine hydrochloride was heated at 47° C. in an aqueous medium containing 2.7% by weight of metal ion derived from titanium trichloride and 13% by weight of hydroxylamine hydrochloride which was injected over a period of 70 hours. After a run time of 70 hours there was only a 20% conversion of the monoallylamine to polyallylamine.

It is obvious that many variations can be made in the products and processes set forth above without departing from the

What is claimed is:

1. A process which comprises polymerizing a monomer charge consisting essentially of 80-100% by weight of a water-soluble salt of monoallylamine and 0-20% by weight of one or more copolymerizable allyl amine comonomers in an aqueous reaction medium at a temperature of about 30-80° C. in the presence of a polymerization initiator comprising about 5-10% by weight of hydrogen peroxide and about 1-700 ppm of a multivalent metal ion, based on the weight of the monomer charge.

2. The process of claim 1 wherein the water-soluble salt is monoallylamine hydrochloride.

3. The process of claim 1 wherein the monomer charge is a mixture of at least about 90% by weight of a water-soluble salt of monoallylamine and up to about 10% by weight of a watersoluble salt of at least one copolymerizable allyl amine comonomer.

4. The process of claim 3 wherein the comonomer is a water-soluble salt of diallylamine.

5. The process of claim 1 wherein the monomer charge is a mixture of at least about 95 mol % of a water-soluble salt of monoallylamine and up to about 5 mol % of a water-soluble salt of a copolymerizable multifunctional allyl amine monomer.

6. The process of claim 1 wherein the multivalent metal ion is an iron, cobalt, manganese, or copper ion.

7. The process of claim 6 wherein the multivalent metal ion is an iron ion which is introduced into the reaction medium in the form of a water-soluble ferric salt.

8. The process of claim 7 wherein the ferric salt is ferric chloride.

9. The process of claim 6 wherein the multivalent metal ion is an iron ion which is introduced into the reaction medium in the form of a water-soluble ferrous salt.

10. The process of claim 9 wherein the ferrous salt is ferrous chloride.

11. The process of claim 1 wherein the amount of free multivalent metal ion in the reaction medium is not more than about 250 ppm, based on the weight of the monomer charge.

12. The process of claim 11 wherein the amount of free multivalent metal ion in the reaction medium is about 3-200 ppm.

13. The process of claim 1 wherein the reaction medium contains a complexing agent to control the concentration of free metal ion.

14. The process of claim 13 wherein the complexing agent is sodium pyrophosphate or potassium pyrophosphate.

15. The process of claim 1 wherein the hydrogen peroxide is introduced into the reaction medium periodically or continuously during the polymerization.

16. A process which comprises homopolymerizing monoallylamine hydrochloride in an aqueous reaction medium at a temperature of about 30-80° C. in the presence of a polymerization initiator comprising about 5-10% by weight of hydrogen peroxide and about 3-200 ppm of free iron ion, based on the weight of monoallylamine hydrochloride, the hydrogen peroxide being introduced into the reaction medium periodically or continuously during the polymerization.

17. The process of claim 16 wherein the iron ion is introduced into the reaction medium in the form of ferric chloride.

18. The process of claim 16 wherein the iron ion is introduced into the reaction medium in the form of ferrous chloride.

* * * * *